United States Patent Office 3,201,352
Patented Aug. 17, 1965

3,201,352
PHOSPHORESCENT MATERIALS
Georg Jayme and Gerhard Bauer, both of Darmstadt, Germany, assignors to E. Merck Aktiengesellschaft, Darmstadt, Germany
No Drawing. Filed Jan. 29, 1962, Ser. No. 169,598
Claims priority, application Germany, Feb. 2, 1961, J 19,360
25 Claims. (Cl. 252—301.2)

This invention relates to phosphorescent materials. It is an object of this invention to provide an improved phosphorescent material as well as a method of producing such a phosphorescent material. It is a still further object of this invention to incorporate the improved phosphorescent material into various articles or to apply it to the surface thereof. Thereby, these articles are rendered capable of producing phosphorescence when irradiated by short wave light.

It is known that certain organic substances showing a fluorescence when irradiated by short wave light exhibit additionally a phosphorescence in solid solutions or in adsorbates. In the pertinent literature, such substances are therefore commonly designated as activating substances. The phosphorescence of several of said activating substances was already observed, for instance, in gels of albumines of low water content such as gelatine, in glassy solidfied sugar melts, in crystallized acids such as tartaric or boric acid and in adsorbates on cellulosic materials such as paper.

However, the phosphorescence of the activating substances known hitherto is extremely sensitive to water, even against moisture; thus, it disappears nearly completely under the influence of a high atmospheric humidity. It has therefore been tried to stabilize phosphorescent adsorbates on cellulosic material, especially on paper, by imbedding them into condensation resins such as ureaformaldehyde resins. To a certain extent, such a protection is sufficient to eliminate the influence of the atmospheric moisture; the phosphorescence disappears, however, also in these cases after wetting of such papers.

Until now, no phosphorescent material really resistant to water is known. For technical application, however, phosphorescent materials being resistant to water and moisture would be eminently important.

It has now been found that such water resistant phosphorescent materials may be provided by combining an activating substance with a triazine compound. Probably, agglomeration or inclusion products are formed thereby the phosphorescence of which is not inhibited by the influence of water.

As activating substances, all known aromatic compounds may be used which are known to be capable of producing a phosphorescence in solid solutions or adsorbates. These compounds are preferably aromatic amines, carboxylic acids, sulfonic acids, amino sulfonic acids, phenols etc. Among the large number of such compounds, the following are named to illustrate and not to limit the group of suitable substances: 2-naphthylamine-7-sulfonic acid and the corresponding sodium salt; 2-naphthylaminoacetyl-7-sulfonic acid; para amino-benzoic acid; para hydroxybenzoic acid; phthalic acid anhydride; terephthalic acid; naphthalene-2-carboxylic acid; 2-naphthylamine-6,8-disulfonic acid; 2-naphthol-6,8-disulfonic acid; fluorene; anthracene; ortho phenylphenol, and the like.

The color of the phosphorescent light depends to a large extent on the ring system of the activating substance. Thus, derivatives of benzene show a blue, those of naphthalene a yellow or green phosphorescence when incorporated in phosphorescent materials. By varying or combining the activating substances, different colors of phosphorescence can be obtained.

Triazine compounds to be used for the phosphorescent materials according to the present invention are preferably cyanuric acid as well as the esters and salts thereof, and melamine. Among the esters of cyanuric acid which could be used in preparing the phosphorescent materials are, for instance, the esters of phenol, naphthol, benzylalcohol as well as the esters of lower aliphatic alcohols containing 1 to 4 carbon atoms, particular methanol and ethanol.

The phosphorescent materials of the invention may be prepared by melting together the activating substances and the triazine compound. Thereby both the components are heated for about 5 minutes up to 2 hours to a temperature exceeding the melting point of the triazine compound. Upon cooling of the molten mass, the phosphorescent material is obtained which may be purified, if desired, by recrystallization. An acidic phosphorescent material may also be purified by dissolving it, for example, in an alkali metal hydroxide and precipitating it from the alkaline solution with an acid such as hydrochloric acid.

Since the well known "boric acid phosphors" are also prepared by melting together the corresponding components (boric acids and an activating substance) the new phosphorescent materials of this invention shall be designated as "triazine phosphors" in accordance with the nomenclature used in the pertinent art. In the special case of the new phosphorescent material containing cyanuric acid, the name "cyanuric acid phosphors" is proposed.

In a preferred embodiment of the present invention, the phosphorescent materials are prepared in such a manner that the triazine compound is formed in the presence of the activating substance. Thus, for example, urea or one of its condensation products such as biuret, triuret or tetruret, may be easily cyclized to form cyanuric acid. This cyclization is effected in a well known manner by heating molten urea or one of its condensation products. In some cases it is advantageous to add a condensation agent for this cyclization, such as chlorine or zinc chloride. To prepare the phosphorescent materials of the invention, the mixtures consisting of the activating substance and of urea or a condensation product thereof are heated to about 100–300° C., preferably to 170–250° C., until the molten mass begins to solidify. However, when using zinc chloride as condensation agent no solidification of the molten mass is noted generally.

The reaction mixture is heated for a time from 10 minutes to 5 hours. In most cases the reaction is finished after 1 to 2 hours.

According to a further feature of the invention, the phosphorescent materials are prepared by combining the activating substances with triazine compounds in the presence of an inert solvent, preferably water. Good results are obtained, for example, by refluxing such solutions or suspensions for some time, for instance, 1 to 10 hours.

According to a still further embodiment of the invention, the phosphorescent materials may be prepared from the activating substances and compounds yielding cyanuric acid upon hydrolysis, such as cyanuric acid chloride. Furthermore, the triazine compounds contained in the phosphorescent material may be prepared by reacting other triazine compounds in the presence of the activating substances. Thus, cyanuric acid chloride may be reacted, for instance, in the presence of the activating substance with ammonia or an amine, such as aniline, naphthylamine, or benzylamine, with phenol, naphthol, benzylalcohol or a lower aliphatic alcohol cotaining from 1 to 4 carbon atoms, to form the correspondingly substituted derivative of cyanuric acid. The phosphorescent materials thus prepared possess a better solubility in organic solvents.

With equal amounts of activating substance, the phosphorescent materials prepared from activating substances and those compounds containing already a triazine ring show in general a less intensive phosphorescence than phosphorescent materials prepared by cyclization of a compound being capable of forming a triazine ring, said cyclization being effected in the presence of the activating substance.

The phosphorescent materials according to this invention contain between 0.1 and 15% of the activating substance, preferably 0.5 to 8%. The content varies largely, depending on the further application of the phosphorescent material.

The new phosphorescent materials are obtained in the form of very fine powders which normally can be used without further pulverization or grinding. In many cases it is preferred to use rather the salts of the phosphorescent material containing cyanuric acid than the acidic compounds which may, for example, act upon cellulose. These salts may be prepared either by using directly the salts in the preparation of the phosphorescent material as described above or by reacting cyanuric acid phosphorescent materials with inorganic or organic bases such as alkalyi metal or alkaline earth metal hydroxides, with ammonia or with aliphatic amines such as ethylene diamine, with organic amines such as aniline, benzylamine, naphthylamine or, preferably, melamine. Other useful salts are those prepared from urea, biuret, guanidine or from quaternary ammonium bases such as tetramethylammonium hydroxide or triethylbenzylammonium hydroxide. These salts, especially the primary melamine salt of cyanuric acid phosphorescent material, are likewise obtained as extremely fine powders and therefore need no further grinding. They may directly be incorporated, for instance, into printing inks.

In comparison with the acidic compounds, the color of the phosphorescence of the salts of the phosphorescent materials is shifted to shorter wave lengths. Phosphorescent materials containing cyanuric acid and a derivative of naphthalene as activating substance show, for instance, a yellow phosphorescence. Phosphorescent materials containing the corresponding cyanurates show a phosphorescence from greenish yellow to greenish blue depending on the cyanurate which may be a primary, a secondary or a tertiary salt in this sequence.

The phosphorescent materials according to the present invention possess an extreme resistance to water and moisture. This is evident, for example, from the fact that they may be recrystallized from water or from an aqueous medium. Even when recrystallized several times the phosphorescence is not at all diminished. By irradiation with ultraviolet light, the phosphorescence becomes visible when the phosphorescent material is just crystallizing from the aqueous solution. It was even noted that the moist phosphorescent materials according to this invention show a somewhat more intensive phosphorescence than products being absolutely dry.

Because of their advantageous properties, the new phosphorescent materials have a large field of application. They may be either incorporated into or applied to the surface of various materials. Incorporation is, for instance, possible into all cellulosic materials, especially all sorts of papers, into plastic materials, lacquers, impregnating compositions, printing or painting inks, paints etc. They may as well be applied to the surface of metals, wood, ceramic goods, paper or other solid materials. An especially important field of application is the use of the new phosphorescent material in statistical and data recording or photoelectric and electronic sorting equipment. For example, printing ink containing the new phosphorescent material can be used to apply code marks on paper or other mass produced articles, which then can be sorted, identified or registered automatically by photocells. The new phosphorescent material is especially suitable for such purposes as their phosphorescence shows a great intensity even after short irradiation and decreases only after a comparatively long period.

The use of the new phosphorescent material is most suitable in all cases where a phosphorescence is needed which is resistant to water and moisture.

The following examples are presented to illustrate the invention and not to limit the specification or appended claims.

*Example 1*

50 g. of urea are mixed thoroughly with 1 g. of the sodium salt of 2-acetylnaphthylamino-7-sulfonic acid. The mixture is heated in an oil bath for half an hour to 220° C. until the molten mass begins to solidify.

The obtained solid mixture exhibits a greenish-yellow phosphorescence after irradiation by ultraviolet light. It is dissolved in 2 N sodium hydroxide and again precipitated by addition of 2 N hydrochloric acid. The precipitate is filtered off, washed with water and dried at room temperature. The obtained product is a fine powder showing a bright yellow phosphorescence after irradiation by ultraviolet light.

Equal quantities of the thus obtained phosphorescent material and of oil varnish are mixed to give an oil paint. The white coats obtained therewith on metal or wood surfaces show a bright yellow phosphorescence.

*Example 2*

50 g. of urea are mixed with 1 g. of para-amino benzoic acid. The mixture is molten and is heated in an oil bath to 220° C. within half an hour until the molten mass begins to solidify.

The obtained mass has a bright blue phosphorescence. It is worked up in the same manner as described in Example 1.

1 part of the thus obtained phosphorescent material is mixed with 3 parts of colourless nitro-cellulose lacquer. The white coats obtained therewith show a blue phosphorescence after irradiation with short wave light.

*Example 3*

100 g. of urea are mixed with 3 g. of phthalic acid anhydride. The mixture is heated up to 180° C. in an oil bath. During 1 to 2 hours a constant stream of dry chlorine is introduced. The obtained phosphorescent material is slightly yellowish brown and is recrystallized as described in Example 1 by addition of charcoal. It shows a light blue phosphorescence.

When added to paints as described in Examples 1 and 2, coats with a blue phosphorescence are obtained.

*Example 4*

According to the method described in Example 3, cyanuric acid and terephthalic acid are molten. The phosphorescent materials thus obtained show a light blue phosphorescence.

The same results are obtained when using biuret instead of cyanuric acid.

The obtained phosphorescent material is suspended in glue. The suspension yields coats on decoration or stained paper showing a light blue phosphorescence.

*Example 5*

240 g. of urea, 7 g. of the sodium salt of 2-naphthylamine-7-sulfonic acid and 240 g. of anhydrous zinc chloride are molten in a round bottomed flask. The mixture is heated to 220° C. for 1 hour. Upon some cooling, the reaction product is precipitated by addition of 150 ml. of water and 250 ml. of concentrated hydrochloric acid. The residue is filtered off, washed with diluted (5%) hydrochloric acid until free from zinc chloride and then with water until free from chloride, and dried at room temperature. It shows a bright yellow phosphorescence.

$1/10$ mole of this phosphorescent material calculated for cyanuric acid is dissolved in $1/10$, $2/10$ and $3/10$ mole of sodium hydroxide, respectively. From these solutions, the primary, secondary and tertiary calcium and/or barium salts of the cyanuric acid phosphorescent material are precipitated by addition of 1/20, 2/20 and 3/20 mole, respectively, of calcium and barium chloride in aqueous solutions.

The primary salts show a greenish yellow phosphorescence, the secondary salts a yellowish green and the tertiary salts a bluish green phosphorescence.

The obtained primary barium cyanurate phosphorescent material is mixed thoroughly with 1 part of a 40% solution of an urea-formaldehyde resin pre-condensation product. The mixture is formed and hardened to give moulded articles showing a greenish yellow phosphorescence when irradiated by ultraviolet light.

Example 6

1/10 mole of cyanuric acid is dissolved in 500 ml. of water with addition of 0.5 g. of the sodium salt of 2-naphthylamine-7-sulfonic acid. The mixture is refluxed for 2 hours. Upon cooling, a phosphorescent material crystallizes which shows a yellow phosphorescence.

Example 7

According to the method described in Example 6, 1/10 mole of melamine and para-amino benzoic acid are combined. The resultant phosphorescent material has a blue phosphorescence when irradiated by short wave light.

3 parts of this melamine containing phosphorescent material are mixed with 2 parts of oil varnish to form an ink for offset printing. The prints obtained therewith are nearly colourless and show a blue phosphorescence when irradiated by short wave light. The phosphorescence is easy to detect by photoelectric equipment.

Example 8

1/10 mole of cyanuric acid chloride is hydrolyzed by refluxing it with 3/10 mole of sodium hydroxide in 200 ml. of water and 0.5 g. of para-oxybenzoic acid for one hour. Upon acidifying the solution with hydrochloric acid a phosphorescent material having a dark blue phosphorescence is obtained.

When using naphthaline-2-carboxylic acid instead of para-oxybenzoic acid, a phosphorescent material having a yellow orange phosphorescence is obtained.

The obtained phosphorescent materials or the salts thereof are processed into pencils and chalks by methods well known in the art by adding the commonly used fillers, carriers and additives such as, for instance, plaster, chalk, paraffine and waxes. With such pencils or chalks, phosphorescent lines, marks or drawings are applied to various surfaces such as those of paper, wood, or plastics.

Example 9

1/10 mole of cyanuric acid chloride and 4/10 mole of phenol are melted for 5 hours at a temperature of 185–210° C. with 0.5 g. of the sodium salt of 2-naphthylamine-7-sulfonic acid. Upon cooling, the obtained mass containing the triphenylester of cyanuric acid and the activating substance is extracted several times with methanol. The residue is recrystallized from dioxane and shows a greenish phosphorescence. When using α-naphthol instead of phenol, the corresponding trinaphthylester is obtained.

When this phosphorescent material is mixed with carboxymethyl cellulose a mass is obtained which gives on papers surface coats showing a green phosphorescence.

Example 10

1/10 mole of the phosphorescent material prepared according to the method described in Example 1 is recrystallized from water with 1/10 mole of pure cyanuric acid containing no activating substance. Upon cooling, a phosphorescent material is obtained which shows a yellow phosphorescence.

Equimolar amounts of this phosporescent material (calculated for cyanuric acid) and melamine are combined in the form of hot, saturated aqueous solutions. The melamine salt of the cyanuric acid phosphorescent material crystallizes in extremely fine microcrystalline needles showing a greenish yellow phosphorescence when irradiated by short wave light.

The thus obtained melamine salt of the phosphorescent material is incorporated in spinnable solutions of acetylcellulose, polyamides or viscose from which are obtained in the usual way phosphorescent films, foils, bands and threads.

By adding the above mentioned melamine salt to suspensions of cellulosic materials used for the manufacture of papers, phosphorescent papers are obtained.

Example 11

1 kg. of urea and 20 g. of the sodium salt of 2-napthylamine-7-sulfonic acid are heated to a temperature of 160–180° C. within 1 hour, 1 kg. of anhydrous zinc chloride is added while stirring in small portions. During this reaction, the temperature raises up to about 220° C. and is maintained for 1 hour. Then the molten mass is poured into 600 ml. of water. By addition of 1000 ml. of concentrated hydrochloric acid, the phosphorescent material is precipitated, filtered off and washed with 5% hydrochloric acid until free from zinc ions and then with water until free from chloride ions. The obtained phosphorescent material is dried at room temperature.

200 g. of the thus obtained phosphorescent material are added to a saturated aqueous solution of urea containing the equivalent amount of urea to form the corresponding primary salt of cyanuric acid which is filtered off upon cooling and dried.

Instead of urea, biuret or guanidine are used to form the corresponding cyanurates.

Example 12

250 g. of cyanuric acid are dissolved in 8 l. of boiling water. The equivalent amount of tetramethyl ammonium hydroxide which is necessary to form the primary cyanurate is added in an aqueous solution. After addition of 10 g. of 2-naphthylamino-7-sulfonic acid the reaction is refluxed for 1 hour. Upon cooling, the phosphorescent material precipitates and is filtered off.

In the same manner, the trimethylbenzylammonium cyanurate is obtained by using trimethylbenzylammonium hydroxide instead of tetramethylammonium hydroxide.

The phosphorescent materials are mixed and molten with oils and waxes to form typewriter ribbon ink which can be applied to nylon typewriter ribbons in the usual way. The ribbons can be used to code papers.

Example 13

50 g. of the trimethylester of cyanuric acid are refluxed for 30 minutes with 1 g. of ortho-phenylphenol in 250 ml. of aqueous ethanol (50%). Upon concentration and cooling, a phosphorescent material is obtained which is filtered off and dried at room temperature; it shows a blue phosphorescence.

Instead of the trimethylester of cyanuric acid, the tribenzyl and triethylester of cyanuric acid are used in the same way to prepare the corresponding phosphorescent material.

The phosphorescent materials are mixed with suitable amounts of waxes, paraffines, mineral oils, and aluminium stearate. This mixture is applied to a base paper as a hot melt whereby a phosphorescent "carbon paper" (transfer paper) is obtained.

Example 14

According to the method described in Example 5, a phosphorescent material is prepared which contains 2-naphthylamine-7-sulfonic acid as the activating substance. 1/10 mole of this phosphorescent material (calculated for cyanuric acid) is dissolved in 1/10 mole of aqueous sodium hydroxide. From this solution, the primary aniline salt is prepared by addition of 1/10 mole of aniline hydrochloride. Upon concentration, the precipitated salt is filtered off and dried at room temperature.

Instead of aniline hydrochloride, the hydrochlorides of naphthylamine, benzylamine or ethylene diamine are used in the same manner to form the corresponding salts.

What we claim is:

1. A phosphorescent composition consisting essentially of a homogeneous mixture, in parts by weight, of about 0.1–15 parts of an activating substance and of about 99.9–85 parts of a triazine compound, said activating substance being an organic compound other than a triazine compound and exhibiting fluorescence per se when irradiated by short wave light and additionally exhibiting a phosphorescence in solid solution and in absorbates, and said triazine compound being selected from the group consisting of cyanuric acid, the esters and salts thereof, and melamine, said composition having a phosphorescence which is extremely resistant to water and moisture.

2. The phosphorescent composition of claim 1 wherein the triazine compound is cyanuric acid.

3. The phosphorescent composition of claim 1 wherein the triazine compound is the melamine salt of cyanuric acid.

4. The phosphorescent composition of claim 1 wherein the triazine compound is formed in the presence of the activating substance.

5. The phosphorescent composition of claim 1 wherein the triazine compound is formed by cyclization of a member of the group consisting of urea and the condensation products thereof in the presence of the activating substance.

6. The phosphorescent composition of claim 1 wherein the activating substance is an aromatic amine.

7. The phosphorescent composition of claim 1 wherein the activating substance is an aromatic carboxylic acid.

8. The phosphorescent composition of claim 1 wherein the activating substance is an aromatic sulfonic acid.

9. The phosphorescent composition of claim 1 wherein the activating substance is an aromatic amino sulfonic acid.

10. The phosphorescent composition of claim 1 wherein the activating substance is a phenol.

11. The phosphorescent composition of claim 1 wherein the activating substance is a polycyclic hydrocarbon.

12. The phosphorescent composition of claim 1 wherein the activating substance is a member of the group consisting of 2-naphthyl amino-7-sulfonic acid and the sodium salt thereof.

13. The phosphorescent composition of claim 1 wherein the triazine compound is a cyanuric acid ester of the group consisting of phenyl, naphthyl, benzyl and lower aliphatic alkyl esters having from 1 to 4 carbon atoms.

14. The phosphorescent composition of claim 1, wherein the triazine compound is a salt of cyanuric acid and a member of the group consisting of alkali metal hydroxides, alkaline earth metal hydroxides, ammonia, ethylene diamine, and aromatic amines of from three to ten carbon atoms.

15. A method of producing a phosphorescent composition, which method comprises melting together a mixture consisting essentially of about 0.1–15 parts of an activating substance and of about 99.9–85 parts of a triazine compound, said activating substance being an organic compound other than a triazine compound and exhibiting fluorescence per se when irradiated by short wave light and additionally exhibiting a phosphorescence in solid solution and in adsorbates, and said triazine compound being selected from the group consisting of cyanuric acid, the esters and salts thereof, and melamine.

16. The method of claim 15, wherein a condensation agent is added prior to the melting of the mixture, said triazine compound being formed in situ from a urea, said condensation agent being capable of cyclizing said urea to form said triazine compound.

17. The method of claim 15 wherein the triazine compound is cyanuric acid, and further comprising the step of reacting said acid, while incorporated in the phosphorescent composition, with a base to form a cyanurate salt.

18. The method of claim 15 wherein the triazine compound is cyanuric acid, and further comprising the step of reacting said acid, while incorporated in the phosphorescent composition, with melamine to form the melamine salt of cyanuric acid.

19. The method of claim 15, wherein the activating substance is selected from the group consisting of 2-naphthylamino-7-sulfonic acid and the sodium salt thereof.

20. A method of producing a phosphorescent composition which method comprises heating a mixture consisting essentially of about 99.9–85 parts of weight of a member of the group consisting of cyanuric acid, the esters and salts thereof, and melamine, with about 0.1–15 parts by weight of an activating substance in the presence of an inert solvent, said activating substance being an organic compound other than a triazine compound and exhibiting fluorescence per se when irradiated by short wave light and additionally exhibiting a phosphorescence in solid solution and in adsorbates.

21. The method of claim 20, wherein the triazine compound is cyanuric acid, and further comprising the step of reacting said acid while incorporated in the phosphorescent composition with a base to form a cyanurate salt.

22. The method of claim 20, wherein the triazine compound is cyanuric acid, and further comprising the step of reacting said acid while incorporated in the phosphorescent composition with melamine to form the melamine salt of cyanuric acid.

23. A paper having incorporated therein the phosphorescent composition of claim 1.

24. A printing ink comprising the phosphorescent composition of claim 1.

25. A typewriter ribbon comprising a base selected from the group consisting of paper, natural textiles, synthetic textiles, and plastic films, said base being impregnated with typewriter-ribbon ink comprising the phosphorescent composition of claim 1.

References Cited by the Examiner

UNITED STATES PATENTS

| | | | |
|---|---|---|---|
| 2,694,064 | 11/54 | Hausermann | 252—301.2 |
| 2,924,549 | 2/60 | Klein et al. | 252—301.2 |
| 2,938,873 | 5/60 | Kazenas | 252—301.2 |

OTHER REFERENCES

"Cyanuric Acid and Derivatives," Smolin and Rapoport, S-Triazines and Derivatives, published by Interscience Publishers Inc., New York, 1959, pages 17–146; pages 26 and 125 most pertinent.

TOBIAS E. LEVOW, *Primary Examiner.*

MAURICE A. BRINDISI, *Examiner.*